A. KINNEAR.
MOLD PLUNGER.
APPLICATION FILED OCT. 6, 1913.

1,152,518.

Patented Sept. 7, 1915.

Witnesses
F. C. Barry
M. C. Lucas

Inventor
ALEXANDER KINNEAR
By
Attorneys

UNITED STATES PATENT OFFICE.

ALEXANDER KINNEAR, OF TOLEDO, OHIO.

MOLD-PLUNGER.

1,152,518.  Specification of Letters Patent.  Patented Sept. 7, 1915.

Original application filed January 14, 1913, Serial No. 742,004. Divided and this application filed October 6, 1913. Serial No. 793,674.

*To all whom it may concern:*

Be it known that I, ALEXANDER KINNEAR, a citizen of the United States, residing at Toledo, in the county of Lucas and State of Ohio, have invented certain new and useful Improvements in Mold-Plungers, of which the following is a specification.

The machine which is the subject of the present invention is designed more particularly for producing clay pots employed in glass making.

The present application is a division of the application filed January 14, 1913, Serial No. 742005, and the subject matter of this divisional application relates more particularly to the plunger which coöperates with the mold to form the pots, a plunger being provided embodying certain novel features of construction to be hereinafter described and claimed.

Figure 1:
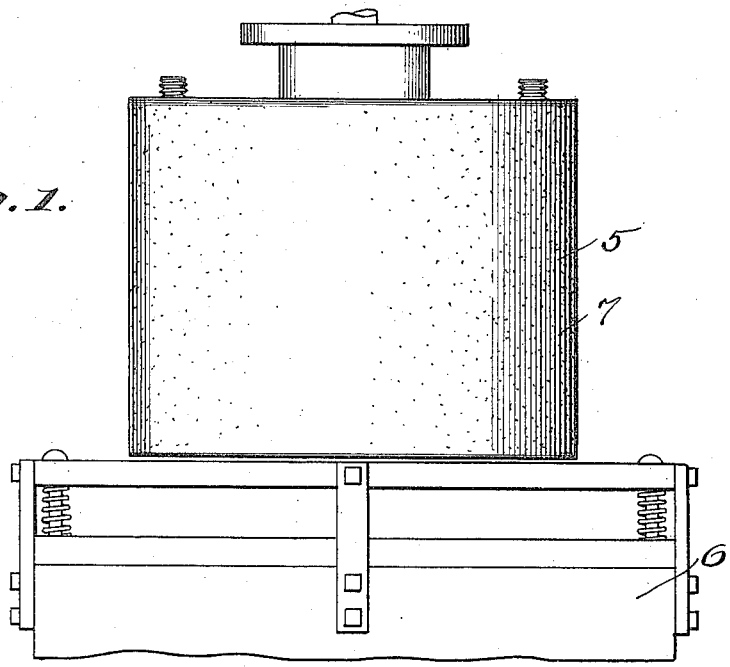
Figure 2:
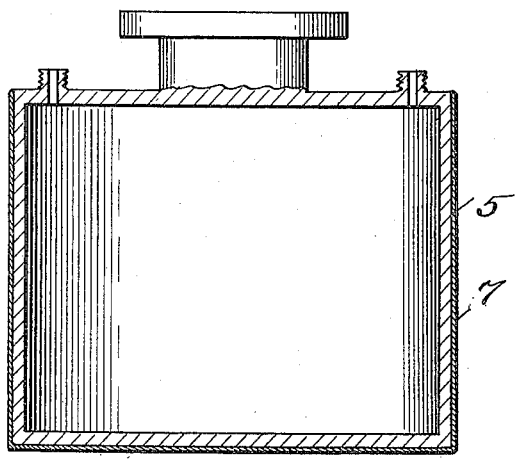

In the accompanying drawing forming a part of this specification, Figure 1 is an elevation of the plunger, and Fig. 2 is a vertical section thereof.

Referring specifically to the drawing 5 denotes a plunger adapted to enter a mold 6 to shape clay or other material therein into the article to be produced. The plunger 5 has a covering 7 of skin, felt or other air-absorbent material, the same fitting snugly over the plunger like a glove and being of any suitable thickness. This covering permits the escape of air when the plunger descends into the mass of clay in the mold. The air, therefore, will not get caught between the surface of the plunger and the adjacent clay to form blisters. The covering being porous absorbs the air and permits it to escape. Without the covering, it would also be difficult to withdraw the plunger on account of the suction and the sticking of the clay to the plunger, but with the covering, the plunger can easily be withdrawn by slightly warming the same, the covering remaining in the molded pot. By leaving the covering remain in the pot, the same helps to support the sides thereof and prevents the latter from drying too fast which is liable to cause cracks in the clay. Furthermore, the covering helps to keep the outside surface of the clay from drying too fast for the interior, and if necessary, the covering may be dampened, and it may be readily pulled out of the pot at any time without danger of injury thereto.

I claim:

1. A mold plunger having a covering of porous material, said covering being air absorbent and free to slip off the plunger to remain on the molded article when said plunger is retracted.

2. A mold plunger having a covering of porous material frictionally held thereon, said covering being air absorbent and free to slip off the plunger to remain on the molded article when the plunger is withdrawn.

In testimony whereof I affix my signature in presence of two witnesses.

ALEXANDER KINNEAR.

Witnesses:
ALEXANDER J. KINNEAR, Jr.,
ERSKINE H. POTTER.

Copies of this patent may be obtained for five cents each, by addressing the "Commissioner of Patents, Washington, D. C."